(12) United States Patent
Christensen et al.

(10) Patent No.: US 11,341,959 B2
(45) Date of Patent: May 24, 2022

(54) CONVERSATION SENTIMENT IDENTIFIER

(71) Applicant: Lenovo (Singapore) Pte. Ltd., Singapore (SG)

(72) Inventors: Tobias Christensen, San Francisco, CA (US); Matthew William Fardig, Boonville, IN (US); Russell T. Covington, West Jordan, UT (US); Travis Lee Ennis, Fortville, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 16/686,824

(22) Filed: Nov. 18, 2019

(65) Prior Publication Data
US 2021/0151037 A1 May 20, 2021

(51) Int. Cl.
*G10L 15/22* (2006.01)
*G10L 15/18* (2013.01)

(52) U.S. Cl.
CPC .......... *G10L 15/1815* (2013.01); *G10L 15/22* (2013.01); *G10L 2015/223* (2013.01)

(58) Field of Classification Search
CPC .......... G10L 15/1815; G10L 15/22–2015/228; G06Q 30/00; G06Q 30/016
See application file for complete search history.

(56) References Cited

U.S. PATENT DOCUMENTS

| | | | |
|---|---|---|---|
| 10,896,428 B1* | 1/2021 | Balasubramaniam | G10L 15/02 |
| 10,990,760 B1* | 4/2021 | Monnett | G06F 40/151 |
| 2019/0050875 A1* | 2/2019 | McCord | G06Q 30/0201 |
| 2019/0273767 A1* | 9/2019 | Nelson | H04L 65/403 |
| 2020/0004816 A1* | 1/2020 | Kieser | G06F 40/35 |

* cited by examiner

*Primary Examiner* — Abul K Azad
(74) *Attorney, Agent, or Firm* — Ference & Associates LLC

(57) ABSTRACT

One embodiment provides a method, including: receiving, at an information handling device, a portion of an audio stream associated with a conversation; transcribing, subsequent to the receiving, the portion; determining, by analyzing the transcribed portion, a sentiment associated with the transcribed portion; and performing, responsive to the determining, a function based on the determined sentiment. Other aspects are described and claimed.

20 Claims, 3 Drawing Sheets

CONVERSATION SENTIMENT IDENTIFIER

BACKGROUND

Individuals frequently utilize their information handling devices ("devices"), for example laptop and/or personal computers, tablet devices, smart phones, and the like, to join an online group where they can interact with other individuals. Examples of online groups include remote conferencing sessions, online presentations, chat rooms, other social groups, and the like. Many of these online groups generally have a presenter, or moderator, that facilitates or oversees the discussion and ensures that the conversation remains on topic and/or that the participants maintain good behavior throughout.

BRIEF SUMMARY

In summary, one aspect provides a method, comprising: receiving, at an information handling device, a portion of an audio stream associated with a conversation; transcribing, subsequent to the receiving, the portion; determining, by analyzing the transcribed portion, a sentiment associated with the transcribed portion; and performing, responsive to the determining, a function based on the determined sentiment.

Another aspect provides an information handling device, comprising: a processor; a memory device that stores instructions executable by the processor to: receive a portion of an audio stream associated with a conversation; transcribe, subsequent to the receiving, the portion; determine, by analyzing the transcribed portion, a sentiment associated with the transcribed portion; and perform, responsive to the determining, a function based on the determined sentiment.

A further aspect provides a product, comprising: a storage device that stores code, the code being executable by a processor and comprising: code that receives a portion of an audio stream associated with a conversation; code that transcribes, subsequent to the receiving, the portion; code that determines, by analyzing the transcribed portion, a sentiment associated with the transcribed portion; and perform, responsive to the determining, a function based on the determined sentiment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
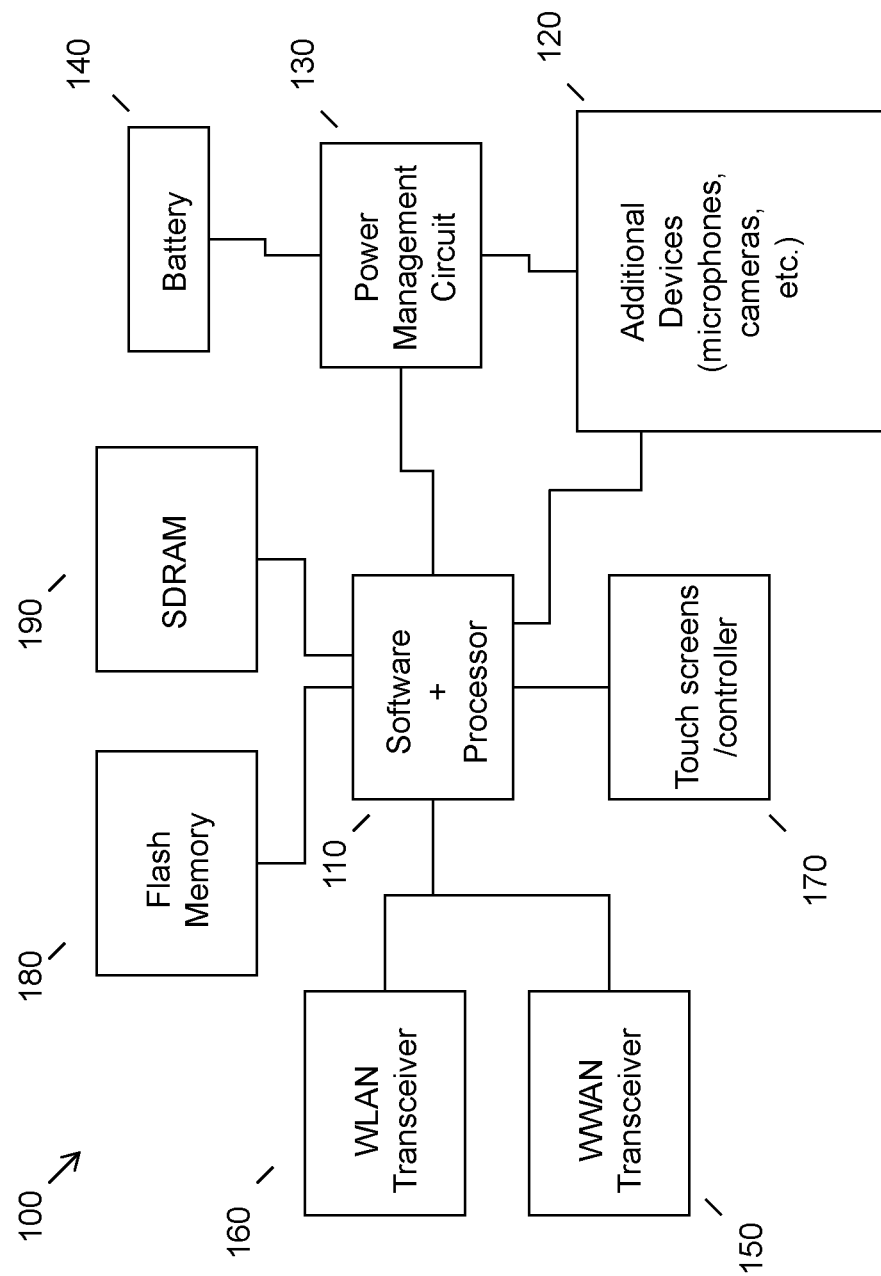
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In discussions occurring in online meetings, trainings, or conferences, a variety of comments are made, or opinions expressed, by one or more of the participants. It is not uncommon for these statements to produce an emotional response in some or all of the other attendees, especially if these statements are offensive, antagonistic, or overly dramatic. Generally, discussions that become too emotional are less constructive for all involved. Therefore, it is in the best interest of the group to monitor and address any of the foregoing types of behavior before it affects the quality of the discussion.

However, it is not always easy to recognize and control the emotional direction of an online discussion. For instance, disruptive statements may be difficult to recognize while a participant is in the midst of the discussion, especially if they are the ones producing the disruptive statements. Furthermore, unlike real-world conversations where individuals may be able to rely on the body language of others to interpret how a particular statement was taken, a conference participant in an online, audio-only discussion may not have that benefit. Therefore, many individuals may not know how certain comments were received by the other attendees in the online discussion.

Existing solutions for maintaining order in online discussions are largely manual in nature. For example, during an online presentation the presenter is not only tasked with delivering their planned material but may also be tasked with analyzing what people are saying, deciding whether the meeting is proceeding in an appropriate and/or expected manner, and thereafter taking action if it is not. However, such a solution places more work and greater stress on the presenter, thereby preventing them from effectively presenting their planned material. Another solution involves assigning another individual to be a moderator for the discussion. The moderator's duties may involve, inter alia, overseeing the conversation occurring in the chat and thereafter notifying the presenter and/or a disrupting participant about any behavior that negatively affects the conversation. However, such a solution is not feasible for all online meetings. More particularly, it may be very difficult for the moderator to convey information to the presenter in a way that does not interrupt their presentation. Additionally, in some situations, the moderator may be required to be unaffiliated with any of the parties involved, which may increase the hassle and cost of utilizing such a service.

Accordingly, an embodiment provides a method for dynamically identifying a sentiment of a portion of a conversation and thereafter performing a corresponding function based on that sentiment. In an embodiment, a portion of an audio stream associated with a conversation may be received at a device. An embodiment may then transcribe the portion and determine a sentiment associated with the transcribed portion. The sentiment determination may involve determining whether a particular portion of the conversation (e.g., a sentence, etc.) is overall positive or negative. Additionally or alternatively, the sentiment determination may involve categorizing the portion as overall positive to the discussion or overall negative to the discussion, regardless of whether the portion itself is net positive or negative. Responsive to determining the sentiment, an embodiment may thereafter perform one or more functions (e.g., notify a participant, notify a presenter, record, take additional remedial actions, etc.) Through sentiment analysis, such a method may be able to provide dynamic actionable feedback to the meeting attendees or the conferencing application itself.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
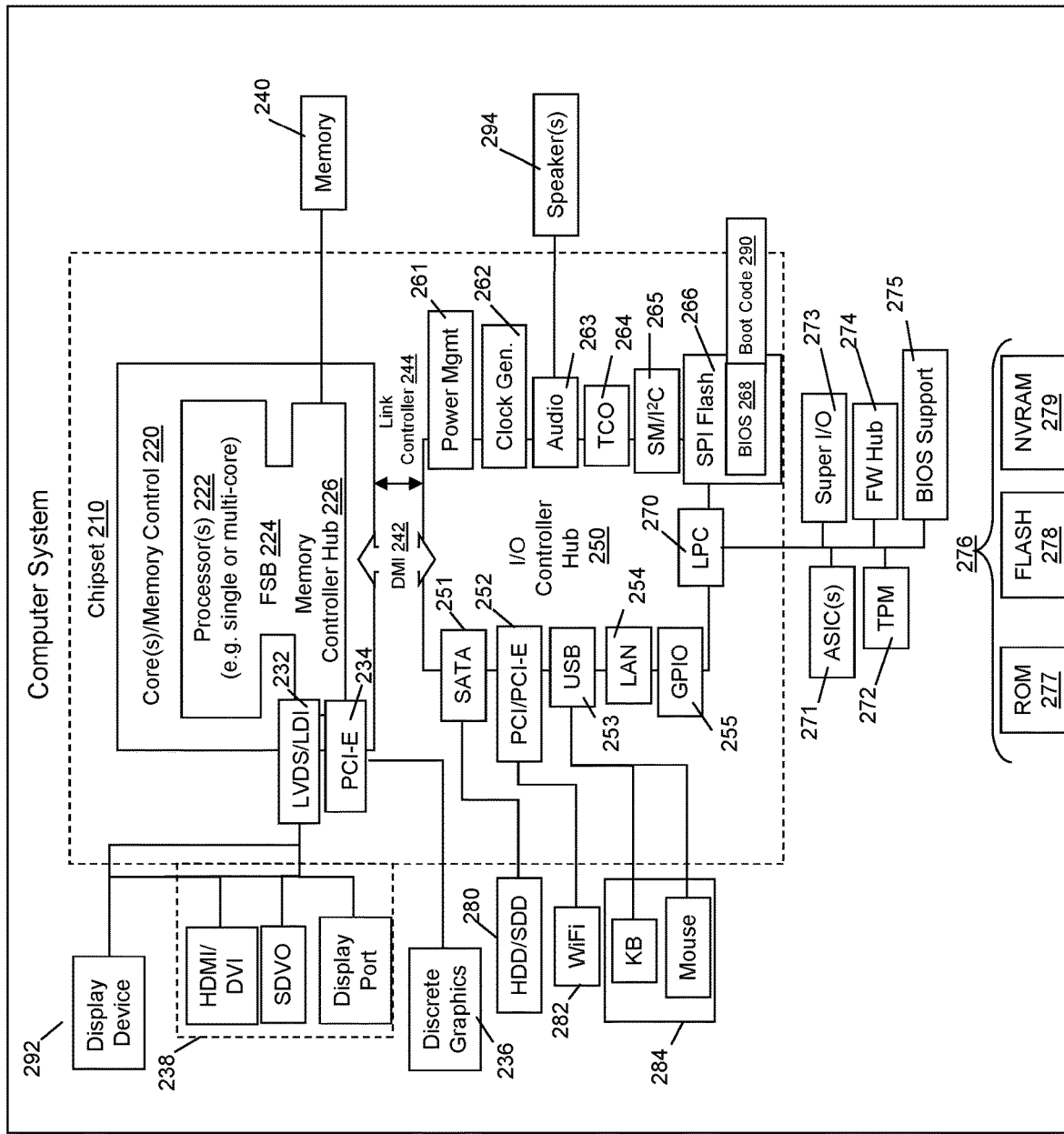
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of connecting to online meetings or conferences. For example, the circuitry outlined in FIG. 1 may be implemented in a smart phone or tablet embodiment, whereas the circuitry outlined in FIG. 2 may be implemented in a laptop.

Figure 3:
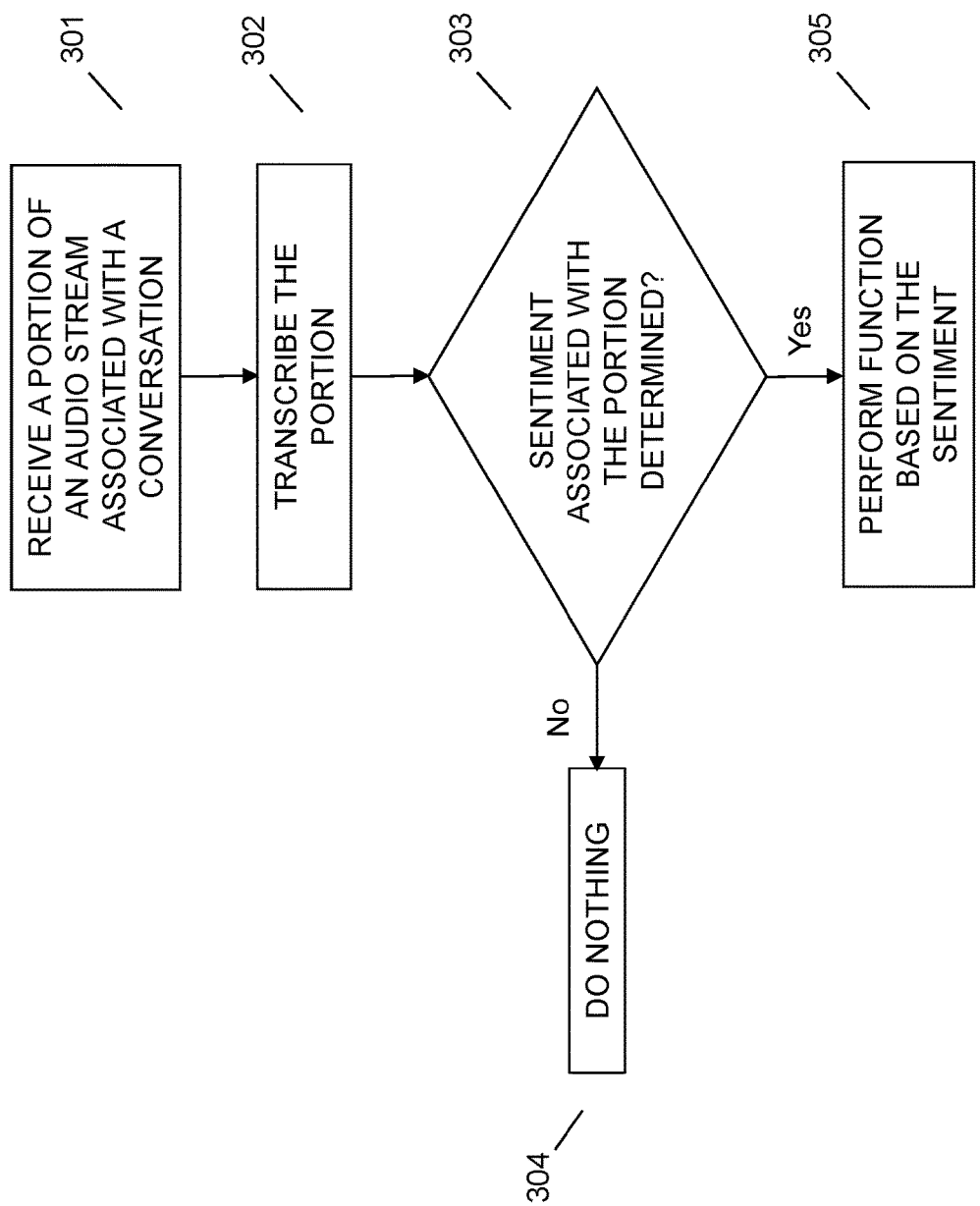
FIG. 3 illustrates an example method of identifying a sentiment of a conversation and thereafter performing a corresponding action.

Referring now to FIG. 3, an embodiment may identify a sentiment associated with a portion of an online, audio conversation and thereafter perform one or more actions based on the sentiment. At 301, an embodiment may receive a portion of an audio stream associated with a conversation. The audio stream may be associated with an audible conversation that occurs in a conversational group and a portion of the audio stream may refer to a segment of the conversation (e.g., a provided sentence or statement, etc.) or, alternatively, to the conversation as a whole. The audio stream may be captured by one or more microphones resident on one or more devices (e.g., a single microphone resident on a singular device positioned in proximity to a real-world conversation, a multitude of microphones where each microphone is integrated into a separate user device, etc.).

In the context of this application, a conversational group may refer to a digital platform capable of hosting two or more individuals (i.e., through connection to the platform from their respective devices) and enabling discussion to occur between them. Accordingly, as an example, a conversational online group may refer to an online conference, an online chatroom, an online classroom or training session, and the like. Individuals may access the online group via a browser URL, a specific application resident on their respective devices, etc. Alternatively, the conversational group may refer to a real-world group where the conversation is captured by a singular device positioned in proximity to and/or among the real-world group.

At 302, an embodiment may transcribe the portion of the audio stream. In an embodiment, the transcription may occur in substantially real time for each portion of conversational audio received. Accordingly, an embodiment may perform the steps described herein in real-time for each segment of audio received. Alternatively, an embodiment may wait to transcribe the audio portion until the entire conversation is completed. An embodiment may identify that the entire conversation is complete by receiving an indication that a meeting has concluded (e.g., by identifying that one or more members have left the meeting, by identifying that a scheduled stop time for the meeting has occurred, by receiving explicit meeting completion input from a presenter or moderator, etc.).

In an embodiment, audio transcription may be facilitated by using one or more conventional audio transcription techniques known in the art. Using these transcription techniques, an embodiment may be able to parse and identify individual words in a statement. In an embodiment, the audible input from each member in the conversational group may be captured, transcribed, and associated with the audio providing member. Alternatively, in another embodiment, only audible input from certain members in the conversational group may be processed. For example, the audible input from a presenter in the conversational group may be ignored whereas the audible input from all other attendees may be captured and transcribed. An embodiment may be able to differentiate the providers of audio input by using one or more techniques known in the art (e.g., voice analysis, metadata identification, etc.)

At 303, an embodiment may determine a sentiment associated with the portion. In an embodiment, the sentiment determination may involve determining whether the particular portion of the conversation (e.g., the provided sentence or statement, etc.) is overall positive or overall negative. An embodiment may do this by identifying the individual words present in the portion and their contextual usage with respect to the portion as a whole. For example, the statement "that was a good idea, let's think about using that" may be considered an overall positive statement. More particularly, an embodiment may identify the presence of one or more positive words, i.e., "good" (e.g., by comparing each word in the portion to an accessible database of known positive words, etc.) and that these positive words contextually relate to other words utilized in the portion in a positive way. Conversely, as another example, the statement "that was a terrible idea, we don't need to hear any more ideas from you" may be considered an overall negative statement. More particularly, an embodiment may identify the presence of one or more negative words, i.e., "terrible", "don't" (e.g., by comparing each word in the portion to an accessible database of known negative words, etc.) and that these negative words are utilized in conjunction with other words in the portion to produce an overall negative or antagonistic statement.

As briefly mentioned above, positive or negative words in a statement may influence the sentiment determination, however, the presence or absence of these words alone may not provide a complete and accurate designation of the sentiment of the portion. Accordingly, an embodiment may analyze how these words are used with respect to other words in a statement and/or how these statements relate to the context of the discussion as a whole. For instance, statements comprising one or more positive words may still be considered disruptive if they are provided at an inappropriate time, if they are inappropriate in nature, and/or if they do not relate to the context of the conversation. As another example, statements comprising one or more negative words may be considered productive to the conversation if, for instance, they are provided for the purpose of issuing constructive feedback on a topic.

Further to the foregoing, an embodiment may determine the degree of positivity or negativity of the portion. More particularly, an embodiment may assign a numerical score to each portion (e.g., from 1 to 10, from 1 to 100, etc.), where a lower numerical value corresponds to a more negative statement and where a higher numerical value corresponds to a more positive statement. The assignment of the numerical score may be based on one or more factors. For example, the numerical score may be influenced simply by the identified number of positive or negative words in a statement, where a greater number of either adjusts the score more towards the corresponding positive or negative range. Additionally or alternatively, the numerical score may be influenced by the productive value of the statement with respect to the topic of the conversation or to the goals of the meeting. More particularly, even if a statement does not have many, or any, identifiable positive words, the statement may still receive a high numerical score if the content of the statement promotes thoughtful discussion or presents points that further the objectives of the meeting. In a similar example, even if a statement comprises a multitude of positive words (e.g., from a group member complementing another member in the meeting, etc.), the statement may still receive a low numerical score if the statement was inappropriate or provided at an inappropriate point in the discussion. Additionally or alternatively, the numerical score may be influenced by the seniority of the target of the statement. For example, the aforementioned statement "that was a terrible idea, we don't need to hear any more ideas from you" directed toward a new member to a group may be especially negative because that new member may be more susceptible to negative comments, which may prevent them from participating in the future.

Responsive to not being able to determine, at 303, a sentiment associated with the portion, an embodiment may, at 304, take no additional action. Conversely, responsive to determining, at 303, a sentiment associated with the portion, an embodiment may, at 305, perform one or more functions based on the determined sentiment.

In an embodiment, one of the functions may be a notification of the determined sentiment to a presenter/moderator of the discussion and/or to a provider of a particular statement. In an embodiment, the notification may be provided to a device of the presenter or participant (e.g., an individual's smart phone, laptop, etc.) and may take virtually any conventional notification form (e.g., an audible notification, a textual notification, a visual notification, any combination of the foregoing, etc.). For example, a presenter may be notified whether the on-going conversation in the group is largely positive or negative. Regarding the latter, an embodiment may provide the presenter with an option to mute the individual that is providing the negative statements. As another example, an embodiment may provide a notification to a negative statement providing individual that warns them to stop providing similar statements or else a disciplinary action may be taken.

In an embodiment, sentiments associated with different portions of the conversation may be tracked and thereafter provided to the presenter for further consideration. This may include sentiment trends over time, sentiment changes, etc. Such information may be useful for a presenter in order to identify the portions of their presentation that should be repeated or emphasized in subsequent iterations of their presentation as well as those portions that they may need to adjust. Additionally, this information may provide an indication regarding the individuals, or types of individuals, which may contribute positively to a conversation and that should be invited to participate in future discussions and, similarly, those individuals that may negatively affect the quality of the conversation and that should not be invited to participate in future discussions.

In an embodiment, the sentiment determination may also be utilized to dynamically group certain individuals together and/or to separate certain individuals from one another. For example, an embodiment may initially detect that a number of participants are negative when they interact with each other. For portions of the conversational group that require formation of sub-groups, an embodiment may dynamically sort the members of the main group to ensure that adversarial members are not placed in the same sub-group.

The various embodiments described herein thus represent a technical improvement to conventional methods for determining a sentiment associated with an audio stream and thereafter performing one or more functions based on the determined sentiment. Using the techniques described herein, an embodiment may receive a portion of an audio stream that it may thereafter transcribe and analysis. An embodiment may then determine, based on the analysis, a sentiment associated with the portion (e.g., a positive sentiment, a negative sentiment, etc.). Thereafter, an embodiment may perform one or more actions based on the determined sentiment (e.g., inform a presenter about a negative statement, notify a warning to a provider of a negative statement, etc.). Such a technique may ensure that the conversation occurring in a conversational group is appropriate and serves to further the objects of the group.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, a portion of an audio stream associated with a conversation, wherein the portion corresponds to a statement provided by a first participant of the conversation to a second participant of the conversation;
transcribing, subsequent to the receiving, the portion;
determining, by analyzing the transcribed portion, a sentiment associated with the transcribed portion, wherein the determining comprises determining the sentiment based at least upon a seniority of the second participant to the first participant with respect to a group; and
performing, responsive to the determining, a function based on the determined sentiment.

2. The method of claim 1, wherein the determining the sentiment comprises:
identifying at least one word in the transcribed portion;
determining a context in which the at least one word was used; and
assigning a sentiment designation to the portion;
wherein the sentiment designation is one of a positive sentiment and a negative sentiment.

3. The method of claim 2, wherein the assigning the sentiment designation comprises assigning a numerical score to the portion, wherein the numerical score is representative of one of: the positive sentiment and the negative sentiment.

4. The method of claim 1, wherein the performing the function comprises notifying a participant of the conversation about the determined sentiment.

5. The method of claim 4, wherein the notifying comprises notifying the participant using at least one notification technique selected from the group consisting of an audio notification, a textual notification, and a video notification.

6. The method of claim 4, wherein the participant is one of: a provider of the portion or a presenter.

7. The method of claim 6, wherein the participant is the provider and wherein the determined sentiment is a negative sentiment and wherein the notifying comprises notifying the provider that the negative sentiment negatively affects the conversation.

8. The method of claim 6, wherein the participant is the presenter and wherein the determined sentiment is a negative sentiment and wherein the notifying comprises providing the presenter an ability to mute the provider of the portion.

9. The method of claim 6, wherein the participant is the presenter and wherein the notifying comprises notifying the presenter about one of: an overall sentiment associated with the conversation and a sentiment change in the conversation.

10. The method of claim 1, wherein the performing the function comprises splitting participants of the conversation into two or more groups.

11. An information handling device, comprising:
a processor;
a memory device that stores instructions executable by the processor to:
receive a portion of an audio stream associated with a conversation, wherein the portion corresponds to a statement provided by a first participant of the conversation to a second participant of the conversation;
transcribe, subsequent to the receiving, the portion;
determine, by analyzing the transcribed portion, a sentiment associated with the transcribed portion, wherein the instructions executable by the processor to determine comprise instructions executable by the processor to determine the sentiment based at least upon a seniority of the second participant with respect to the first participant with respect to a group; and
perform, responsive to the determining, a function based on the determined sentiment.

12. The information handling device of claim 11, wherein the instructions executable by the processor to determine the sentiment comprise instructions executable by the processor to:
identify at least one word in the transcribed portion;
determine a context in which the at least one word was used; and
assign a sentiment designation to the portion;
wherein the sentiment designation is one of a positive sentiment and a negative sentiment.

13. The information handling device of claim 12, wherein the instructions executable by the processor to assign the sentiment designation comprise instructions executable by the processor to assign a numerical score to the portion, wherein the numerical score is representative of one of: the positive sentiment and the negative sentiment.

14. The information handling device of claim 11, wherein the instructions executable by the processor to perform the function comprise instructions executable by the processor to notify a participant of the conversation about the determined sentiment.

15. The information handling device of claim 14, wherein the participant is one of: a provider of the portion or a presenter.

16. The information handling device of claim 15, wherein the participant is the provider and wherein the determined sentiment is a negative sentiment and wherein the instructions executable by the processor to notify comprise instructions executable by the processor to notify the provider that the negative sentiment negatively affects the conversation.

17. The information handling device of claim 15, wherein the participant is the presenter and wherein the determined sentiment is a negative sentiment and wherein the instructions executable by the processor to notify comprise instructions executable by the processor to provide the presenter an ability to mute the provider of the portion.

18. The information handling device of claim 15, wherein the participant is the presenter and wherein the instructions executable by the processor to notify comprise instructions executable by the notify the presenter about one of: an overall sentiment associated with the conversation and a sentiment change in the conversation.

19. The information handling device of claim 11, wherein the instructions executable by the processor to perform the function comprise instructions executable by the processor to split participants of the conversation into two or more groups.

20. A product, comprising:
a storage device that stores code, the code being executable by a processor and comprising:
code that receives a portion of an audio stream associated with a conversation, wherein the portion corresponds to a statement provided by a first participant of the conversation to a second participant of the conversation;

code that transcribes, subsequent to the receiving, the portion;

code that determines, by analyzing the transcribed portion, a sentiment associated with the transcribed portion, wherein the code that determines comprises code that determines the sentiment based at least upon a seniority of the second participant with respect to the first participant with respect to a group; and code that performs, responsive to the determining, a function based on the determined sentiment.

* * * * *